US000001535H

United States Statutory Invention Registration [19]

[11] Reg. Number: H1535

Binder et al.

[45] Published: Jun. 4, 1996

[54] TREATMENT PROCESS FOR PRESERVING BOOKS, PAPERS, FILMS, PHOTOGRAPHS AND REPORTS

[75] Inventors: Michael Binder, Brooklyn, N.Y.; Robert J. Mammone, South Plainfield, N.J.

[73] Assignee: The United States of America as represented by the Secretary of the Army, Washington, D.C.

[21] Appl. No.: 344,799

[22] Filed: Nov. 23, 1994

[51] Int. Cl.[6] ..... H05F 3/04

[52] U.S. Cl. ..... 204/165; 204/164

[58] Field of Search ..... 204/164, 165, 204/168

[56] References Cited

FOREIGN PATENT DOCUMENTS 2120694 12/1983 United Kingdom ..... 204/165

OTHER PUBLICATIONS

CA110:136, 835,"Free Radicals In Cellulose Fibers Treated with Low–Temperature Plasma", 1989.

CA118:236, 226,"Paper With Hydrophobic Surface", 1993.

E. M. Liston, Plasma Treatment For Improved Bonding: A Review, J. Adhesion, vol. 30, pp. 199–218 (1989).

*Primary Examiner*—Charles T. Jordan

*Assistant Examiner*—John R. Hardee

*Attorney, Agent, or Firm*—Michael Zelenka; William H. Anderson

[57] ABSTRACT

A method for making books, papers and film more resistant to moisture and pollution degradation using a low pressure, low temperature gas plasma.

3 Claims, 1 Drawing Sheet

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

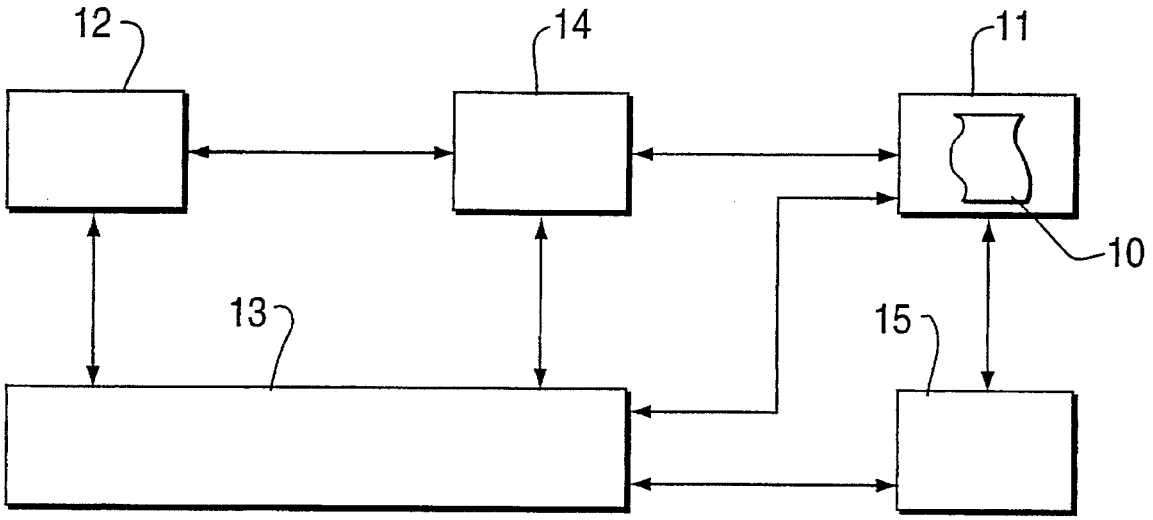
12
14
11
10
13
15

TREATMENT PROCESS FOR PRESERVING BOOKS, PAPERS, FILMS, PHOTOGRAPHS AND REPORTS

GOVERNMENT INTEREST

The invention described herein may be manufactured, used, and licensed by or for the Government for governmental purposes without the payment to us of any royalty thereon.

FIELD OF THE INVENTION

This invention relates generally to processes for preserving cellulose-based materials and film materials, and more particularly to a method for making books, papers and film more resistant to acid degradation using a low pressure, low temperature gas plasma.

BACKGROUND OF THE INVENTION

A problem commonly encountered in storing old cellulose-based materials such papers, books, documents and pamphlets, as well as in storing photographs and films, is that such materials tend to become discolored and/or brittle with time. This degradation is due to the fact that some of the residual chemicals remaining in the paper from the paper manufacturing process, or from having been deliberately added to promote certain desirable properties, react with moisture present either in the air or in the paper to form reaction products. These reaction products, generally sulfuric acid, degrade the cellulose structure of the paper causing brittleness, cracking and/or yellowing of the paper. Another source of degradation of paper products comes from pollutants found in the air we breathe. Various pollutants found in the atmosphere react with moisture to form various acids which weaken and destroy paper. The foregoing sources of degradation cause serious problems for.libraries, historical archives, depositories, etc., where millions of books and documents are lost every year to degradation reactions. As an example, approximately one third of the books and pamphlets in the Library of Congress are too brittle for circulation. See H. M. Malin, Chemistry, Vol. 52, at pp. 17 (1979). Numerous treatment processes have been proposed for treating paper products in order to stop or retard these degradation processes. See E. M. Liston, Plasma Treatment for Improved Bonding.: A Review, J. Adhesion, Vol. 30, at pp. 199–218 (1989). The disadvantage of these existing processes, however, is that they generally involve the application of messy acid-neutralization substances which are expensive and are hazardous to use. It is, therefore, an object of this invention to a provide a safe, clean and inexpensive method for preserving paper and film products using gas plasmas.

SUMMARY OF THE INVENTION

A method for preserving paper and film products wherein said products are made more resistant to acid degradation caused by moisture and pollution by being exposed to a low pressure, low temperature gas plasma.

BRIEF DESCRIPTION OF THE DRAWINGS

FIG. 1 shows an exemplary embodiment of the equipment used to treat paper according to this invention.

DETAILED DESCRIPTION OF THE DRAWINGS

Referring to FIG. 1, there is shown the equipment used for treating paper 10 according to the method which is the present invention. This equipment includes a reactor center 11, a power supply 12, a controller 13, an impedance matching network 14, and a system controller 15. Paper 10 which is to be treated is placed in reactor 11. Reactor 11 is coupled to power source 12 which excites a gas introduced through controller 13 to form a gas plasma in reactor 11. Impedance matching network 14 is coupled between reactor 11 and power supply 12. Vacuum pump 15 is coupled to reactor 11. Controller 13 is also coupled to power source 12, impedance matching network 14 and vacuum pump 15.

A gas plasma is an ionized gas having an equal number of positive and negative charges in a given volume. A lightening bolt, a flame and a neon sign are all examples of plasmas. Most of the positive charges are ions and most of the negative charges are electrons. Because of the large mass difference between these species, the ions are almost stationary in the plasma and most of the current is carried by the electrons. It has been known for many years that plasmas can effect desirable changes in the surface properties of materials, The extremely energetic chemical environment of plasmas are used to make chemical changes in the material surface to which the plasma gas bonds.

All significant reactions in the gas plasma treatment of materials are based on free radical chemistry. Surface free.radicals are created by direct attack of gas-phase free radicals, ions, or by photodecomposition of the surface of the material being treated by vacuum-ultraviolet (u.v.) light generated in the plasma. The surface free-radicals are then able to react either with each other, or with species in the plasma environment.

Many different gases and plasma operating parameters are used in the surface treatment of different materials. Most of the radicals will be in the ground state. However, free radicals can also exist in electronically excited states that carry a great deal more energy than the ground state radicals. The four major effects observed when the surface of material is treated with a gas plasma are: the cleaning of organic contamination from the surface of material; material removal by ablation (micro-etching) to increase surface area or to remove a weak boundary layer; crosslinking or branching to strengthen the surface cohesiveness; and surface chemistry modification to improve chemical and physical interactions at the bonding interphase. Although each one of these four effects is always present to some degree, one effect may predominate depending on substrate chemistry, reactor design, the gas used and the processing conditions.

When gas-phase radicals impinge on the surface of paper 10, they have sufficient energy to break bonds in that surface. This results in abstraction of atoms or molecular fragments which can react further in the plasma to form volatile species that are removed by vacuum system 15. The abstraction causes a progressive ablation of the organic surface of paper 10 and the formation of residual free-radicals in the surface. These can either react with themselves to produce cross-linking of the surface or they can react with the plasma gas to form new chemical species in the surface of paper 10.

In the present invention, free-radicals created by a low-pressure gas plasma are used to chemically modify paper 10. It is important that the surface of paper 10 be cleaned before plasma treatment and that the treatment time be long enough to remove any weak boundary layer. This process only affects the top few molecular layers (about 100 Å) so that the appearance or bulk properties of the material is not changed.

The method which is the present invention involves briefly exposing paper 10 to a low pressure, low temperature gas plasma readily formed when a given gas at low pressure is excited with microwave or radio frequency (r.f.) energy. The incoming energy causes the gas to ionize and form different species such as ions, radicals, electrons and u.v. light which then react with any exposed surface to chemically modify the surface of paper 10. This process can take place at room temperature so that the temperature of paper 10 need not be raised. The chemically modified surface of paper 10 is now better suited to withstand the effects of acid degradation caused by moisture and pollution, and thus make paper 10 more resistant to yellowing, cracking and/or becoming brittle.

Alternatively, the residual materials in the paper 10 are removed, modified or neutralized by the action of the gas plasma. This stops any further degradation of the cellulose. The gas treatment process can be used to treat paper 10 so as to make it less prone to degradation by pollutants or other chemicals. The present invention makes document 10 more resistant to degradation principally through surface chemistry modification, and to a lesser extent through ablation.

Low pressure plasma systems operate at 0.1 Torr to 1.0 Torr (13 Pa to 133 Pa) with a continuous gas flow into reactor 11. Vacuum 15 must be able to maintain this pressure/flow regime. Moderate vacuum levels do not require sophisticated pumps. Two-stage mechanical pumps can be used. The pump package is usually sized to move 1000 cc/min., depending on the size of reactor 11. Reactor 11 is a pressure vessel designed to support the pressure/flow conditions of the plasma, couple the electrical energy into the plasma, and contain paper 10 which is to be treated.

Power supply 12 furnishes the electrical power necessary to generate the plasma. The power required ranges from 50 watts to 500 watts depending on the size of rector 11. Larger generators are usually cooled, either with air or water. Plasma reactors have been built utilizing a wide range of frequencies, from DC to microwave.

As used in the present invention, power supply 12 is used to generate either r.f. or microwave plasmas. R.f. plasmas (13.65 MHz) are easily generated with commercially available equipment. R.f. plasmas require that impedance matching network 14 be used to match the impedance of the plasma to the output impedance of the power supply 12. Impedance matching network 14 can be tuned either manually or automatically with servo-driven devices. At 13.56 MHz the plasma is very stable and reactive because the quench time of the plasma species is much longer than the time between half-cycles of the excitation. Microwave plasmas (2450 MHz) may be even more reactive than r.f. plasmas.

Impedance matching network 14 is usually an adjustable transformer or a manual, or servo-driven, pi-network that transforms the impedance of the plasma to the required output impedance of power supply 12. A match is necessary to prevent excessive reflected power from damaging power supply 12 as well as to know how much power is being dissipated in the plasma. The impedance of the plasma can vary from a few ohms to several thousand ohms and can be very reactive depending on the gas used, the reactor design and the operating conditions. The use of impedance matching network 14 makes it possible to use one plasma system with many different gases and operating conditions.

System controller 15 controls all the process variables such as the type of gas being introduced, gas flow rate, power level and processing time. Controller 15 may consist of simple discrete relays, timers and needle valves, or it might be a microprocessor based system with sophisticated displays, fully automated process controls, multiprocess capabilities, and data-output and alarm systems. The method which is the present invention can be used in a batch operation or in continuous processing of paper 10.

It will be understood that the embodiments described herein are merely exemplary and that a person skilled in the art may make many variations and modifications to the described embodiments utilizing functionally equivalent elements to those described. Any variations or modifications to the invention just described are intended to be included within the scope of said invention as defined by the appended claims.

What is claimed is:

1. A method for treating a paper product to prevent said paper product from cracking, yellowing, or becoming brittle, comprising:

exciting a gas at a predetermined pressure and a predetermined temperature to form a gas plasma; and briefly exposing said paper product to said gas plasma.

2. A method for treating a paper product to make said paper product more resistant to acid degradation, comprising:

exciting a gas at a predetermined pressure and a predetermined temperature to form a gas plasma; and briefly exposing said paper product to said gas plasma.

3. A method for treating a film product to make said film product more resistant to acid degradation, comprising:

exciting a gas at a predetermined pressure and a predetermined temperature to form a gas plasma; and briefly exposing said film product to said gas plasma.

* * * * *